US010875377B2

(12) United States Patent
Harvey

(10) Patent No.: US 10,875,377 B2
(45) Date of Patent: *Dec. 29, 2020

(54) SWAY BAR LINKAGE WITH BUSHING

(71) Applicant: Federal-Mogul Motorparts LLC, Southfield, MI (US)

(72) Inventor: Richard W. Harvey, Old Monroe, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/028,997

(22) Filed: Jul. 6, 2018

(65) Prior Publication Data

US 2018/0312027 A1 Nov. 1, 2018

Related U.S. Application Data

(63) Continuation-in-part of application No. 15/197,168, filed on Jun. 29, 2016, now Pat. No. 10,017,026.

(60) Provisional application No. 62/253,379, filed on Nov. 10, 2015.

(51) Int. Cl.
*B60G 21/055* (2006.01)

(52) U.S. Cl.
CPC .. *B60G 21/0551* (2013.01); *B60G 2204/1224* (2013.01); *B60G 2206/11* (2013.01); *B60G 2206/427* (2013.01)

(58) Field of Classification Search
CPC ............. B60G 21/055; B60G 21/0551; B60G 2204/1224; B60G 2204/416; B60G 2204/8302; B60G 2206/11; B60G 2206/427; B60G 7/005; F16F 1/3615;
(Continued)

(56) References Cited

U.S. PATENT DOCUMENTS

| 4,113,278 A | 9/1978 | Rissberger |
| 5,449,193 A | 9/1995 | Rivard et al. |
| 5,551,722 A | 9/1996 | Schwartz et al. |

(Continued)

FOREIGN PATENT DOCUMENTS

| DE | 6801096 U | 3/1969 |
| DE | 6609204 U | 3/1972 |

(Continued)

OTHER PUBLICATIONS

International Search Report, dated Feb. 9, 2017 (PCT/US2016/061216).
U.S. Appl. No. 15/197,168, filed Jun. 29, 1026.

*Primary Examiner* — Laura Freedman
(74) *Attorney, Agent, or Firm* — Dickinson Wright PLLC

(57) ABSTRACT

The sway bar linkage connects a sway bar with a control arm of a vehicle suspension system. The linkage includes a fastener and a plurality of bushings disposed between the fastener and the sway bar and between the fastener and the control arm. At least one of the bushings is constructed as a single piece of material, presents an outer surface, presents an inner bore which extends along an axis for receiving the fastener, and presents a plurality of pockets. The pockets are spaced radially between the inner bore and the outer surface for allowing the bushing to more easily deflect and absorb energy while transferring forces between the sway bar, fastener and control arm.

13 Claims, 7 Drawing Sheets

(58) Field of Classification Search
CPC ........ F16F 1/3732; F16F 1/3735; F16F 1/374; F16F 1/3873; F16F 1/393
See application file for complete search history.

(56) References Cited

U.S. PATENT DOCUMENTS 10,017,026 B2 * 7/2018 Harvey .................. F16F 1/374
2006/0226622 A1 10/2006 Trotter

FOREIGN PATENT DOCUMENTS

EP            0636504 A1     2/1995
JP            08295116 A * 11/1996

* cited by examiner

SWAY BAR LINKAGE WITH BUSHING

CROSS-REFERENCE TO RELATED APPLICATION

This application is a Continuation-In-Part of and claims the benefit of and priority to co-pending U.S. patent application Ser. No. 15/197,168, filed Jun. 29, 2016, which claims priority to U.S. Provisional Patent Application No. 62/253,379, filed Nov. 10, 2015, the entire disclosure of each of these applications being considered part of the disclosure of this application and hereby incorporated by reference.

BACKGROUND OF THE INVENTION

1. Field of the Invention

The present invention is related, generally, to sway bar link kits for attaching sway bars of vehicles with other suspension components.

2. Related Art

Many vehicle suspension systems include a sway bar (also commonly referred to as an anti-sway bar or an anti-roll bar) for limiting body roll when the vehicle is going through a turn at speed. Such sway bars include a single bar or tube which extends laterally across a vehicle and is connected with the left and right wheel assemblies of the vehicle. In many cases, the sway bar is connected to the wheel assemblies via sway bar linkages. Some sway bar linkages include a bolt and a plurality of bushings which directly contact the sway bar and a component of the wheel assembly (for example, a lower control arm). During operation of the vehicle, forces are transferred between the wheel assembly and the sway bar via the bushings and the bolt. Over time, the bushings and/or the bolts of the sway bar linkages can wear out, which may require replacement of the entire sway bar linkage.

SUMMARY OF THE INVENTION AND ADVANTAGES

One aspect of the present invention is related to a sway bar linkage kit for connecting a sway bar with a control arm of a vehicle suspension system. The sway bar linkage kit includes a fastener and at least two bushings. At least one of the bushings is constructed as a single piece of material which presents an outer surface that extends from a first end to a second end. At the first end, the outer surface has a first diameter, and at the second end, the outer surface has a second diameter which is less than the first diameter. The bushing also presents an inner bore, which extends along an axis for receiving the fastener, and a counterbore adjacent the first end. The bushing also has a plurality of pockets that are spaced radially between the inner bore and the outer surface for allowing the bushing to more easily deflect and absorb energy while transferring forces. The pockets only open into the counterbore adjacent the first end. A washer is received in the counterbore and covers the pockets.

According to another aspect of the present invention, all of the bushings are generally identically constructed, and a washer is received in the counterbore of each of the bushings.

According to yet another aspect of the present invention, each of the bushings presents a plurality of radially inwardly extending lips adjacent an axial end with the counterbore for trapping one of the washers in the counterbore.

According to still another aspect of the present invention, the fastener is fixedly attached with a ball joint.

According to a further aspect of the present invention, the fastener is formed as a single piece with a housing of the ball joint.

According to yet a further aspect of the present invention, the fastener is disposed in an end region of a post which extends from the housing to the ball joint.

According to still a further aspect of the present invention, the outer surface of each of the bushings has a greater diameter adjacent one axial end than adjacent an opposite axial end.

According to another aspect of the present invention, the outer surface of each of the bushings includes a spheroidal portion.

Another aspect of the present invention is related to a vehicle suspension assembly. The suspension assembly includes a sway bar with a sway bar opening. The suspension assembly also includes a control arm. A linkage interconnects the sway bar with the control arm. The linkage includes a ball joint which is operably attached with the control arm. The linkage also includes a fastener which is fixedly attached with the ball joint and which extends through the sway bar opening. At least one bushing is disposed at least partially in the sway bar opening between the sway bar and the fastener for transferring forces between the sway bar and the fastener. The at least one bushing is constructed as a monolithic piece of material and has an outer surface which extends from a first end to a second end. The first end has a first diameter, and the second end has a second diameter which is less than the first diameter. The at least one bushing also presents a counterbore adjacent the first end and a plurality of pockets which are spaced radially between the inner bore and the outer surface for allowing the bushing to more easily deflect and absorb energy while transferring forces. The pockets only open into the counterbore adjacent the first end. For each of the at least one bushing, a washer is received in the counterbore and covers the pockets.

According to another aspect of the present invention, the at least one bushing is further defined as two bushings.

According to yet another aspect of the present invention, the bearings are of generally identical construction.

According to still another aspect of the present invention, the pockets in each of the bushings are generally conical in shape.

According to a further aspect of the present invention, the ball joint is oriented generally perpendicularly to the fastener.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
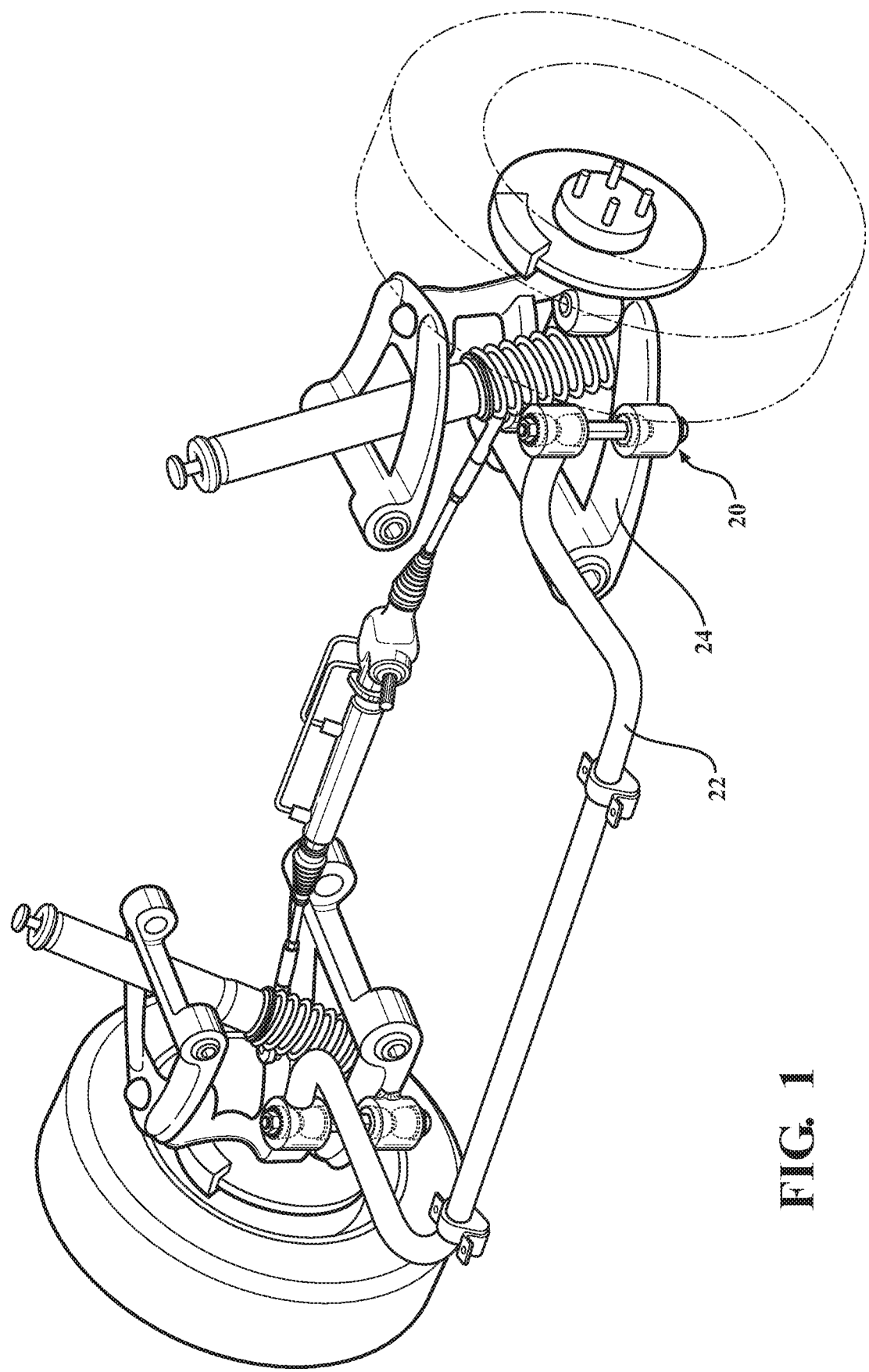
FIG. 1 is a perspective view of an exemplary embodiment of a vehicle suspension system with a linkage constructed according to one aspect of the present invention extending between and interconnecting a sway bar and a control arm.

Referring to the Figures, wherein like numerals indicate corresponding parts throughout the several views, FIG. 1 shows a first exemplary embodiment of a linkage 20 extending between and connecting a sway bar 22 (sometimes also referred to as an anti-sway bar or an anti-roll bar) and a control arm 24 of a suspension system of a vehicle. As shown, in the exemplary embodiment, the sway bar 22 and the control arm 24 are spaced from one another, and the linkage 20 extends through a sway bar opening adjacent one end of the sway bar 22 and through a control arm opening which is spaced from a pivot axis of the control arm 24. As such, during operation of the vehicle, movement of the control arm 24 is translated via the linkage 20 to the sway bar 22. The wheel assembly could be on the driver side or the passenger side and could be either in the front or the back of the vehicle, and it should be appreciated that the sway bar 22 and the control arm 24 could take a range of configurations.

Figure 2:
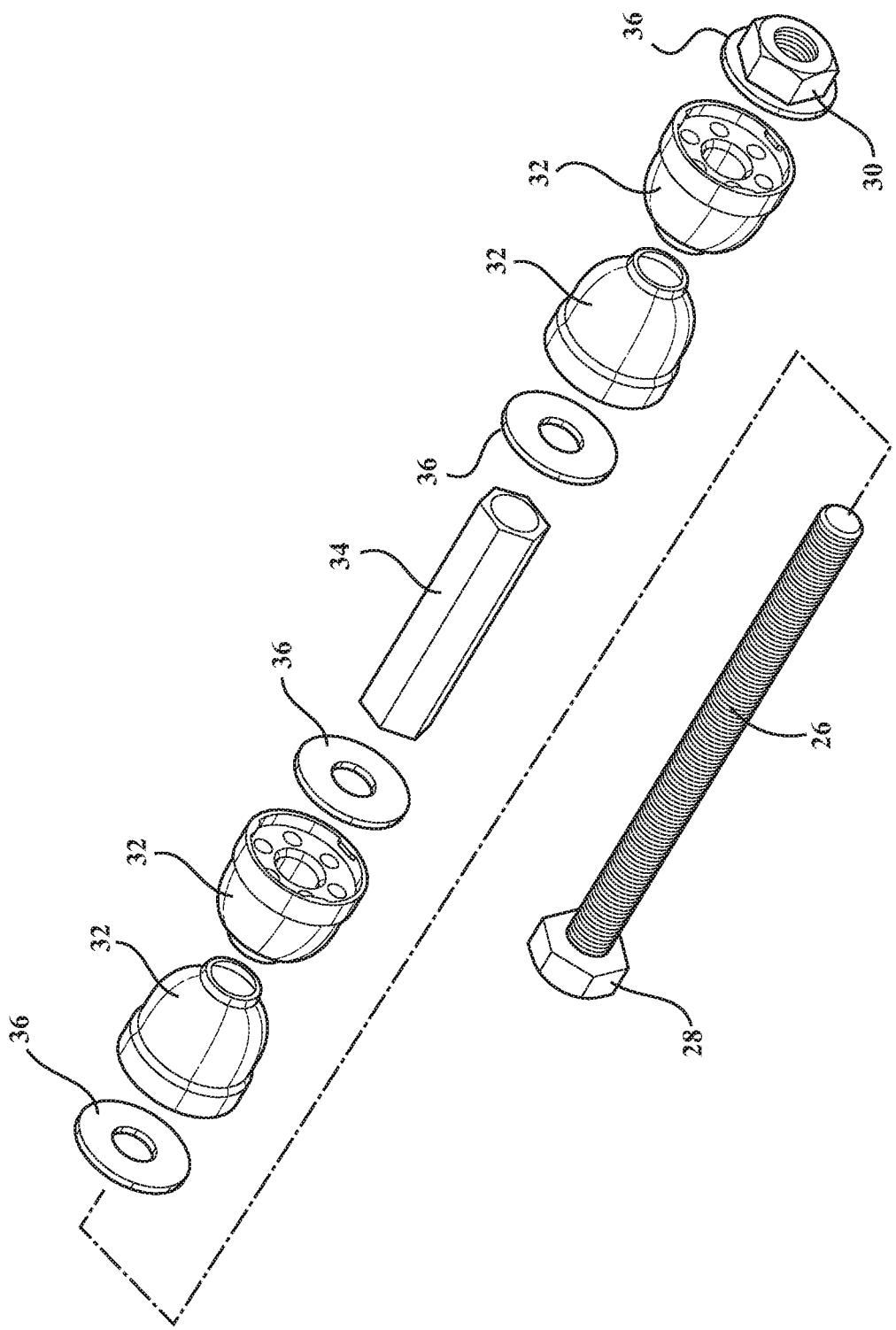
FIG. 2 is a perspective and exploded view of an exemplary embodiment of a sway bar linkage kit for assembling the linkage shown in FIG. 1.
Figure 3:
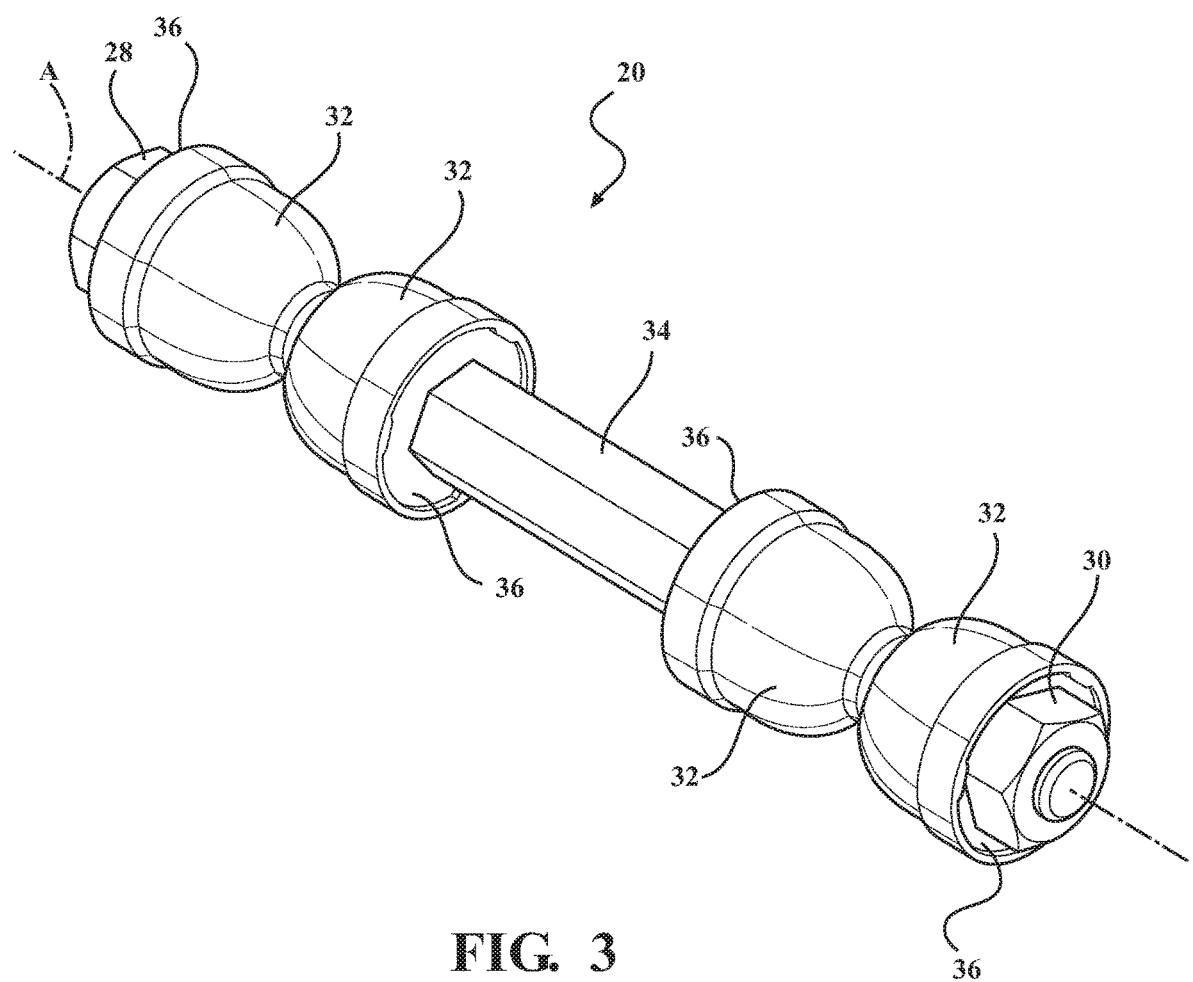
FIG. 3 is a perspective view of the sway bar linkage kit assembled.

The linkage 20 shown in FIG. 1 is assembled from an exemplary embodiment of a sway bar linkage kit 20 which is shown in FIGS. 2 and 3. The exemplary sway bar linkage kit 20 includes a fastener in the form of a bolt 26 which extends along an axis A from a tool-receiving end 28 to a threaded form for receiving a nut 30, such as a barrel nut. The linkage kit 20 further includes two pairs of bushings 32 (four bushings 32 in total) for connecting the sway bar 22 and the control arm 24 with the bolt 26. Specifically, one pair of bushings 32 is positioned within an opening in an end of the sway bar 22, and the other pair of bushings 32 is positioned within an opening in the control arm 24. The bushings 28 have co-axially aligned inner bores for sliding onto the bolt 26 from the threaded end of the bolt 26. The linkage kit 20 also includes a spacer 34 which is dimensioned for maintaining the pairs of bushings 32 a predetermined distance apart from one another. A plurality of washers 36 are also provided for protecting the bushings 32 from the bolt 26, the nut 30 and the spacer 34. In this embodiment, one of the washers 36 is integrally attached with the nut 30 but could alternately be a separate piece therefrom.

The bushings 32 are preferably generally identical in shape and construction to allow for manufacturing costs savings through economies of scale by manufacturing the same design for all four of the bushings 32 in the linkage kit 20. Referring now to FIGS. 3-6, an exemplary embodiment of the bushing 3 design is generally shown. Each bushing 32 is made as a single, integral piece of material and extends along the axis A from an open first end 38 to an open second end 40 with the inner bore extending between the open first and second ends 38, 40. The bushings 32 are preferably made through injection molding but may be shaped through any suitable manufacturing process.

In the exemplary embodiment, each bushing 32 has a progressively decreasing outer diameter from the first end 38 to the second end 40. Adjacent the first end 38, the outer surface has a cylindrical portion 42 which is generally cylindrical in shape. The outer surface then presents a first tapered portion 44 which tapers inwardly at a generally constant angle relative to the axis A from the cylindrical portion 42 to a rounded portion 46 with a generally spheroidal shape. Finally, adjacent the second end 40, the outer surface has a second tapered portion 48 which tapers inwardly from the rounded portion 46 to the second end 40. The inner surface of the bushing 32 presents a counterbore 50 for receiving a washer 36 (shown in FIGS. 2 and 3) and a bolt receiving portion 52 which is generally cylindrical in shape with a generally constant diameter for receiving the bolt 26 (shown in FIGS. 2 and 3).

Figure 4:
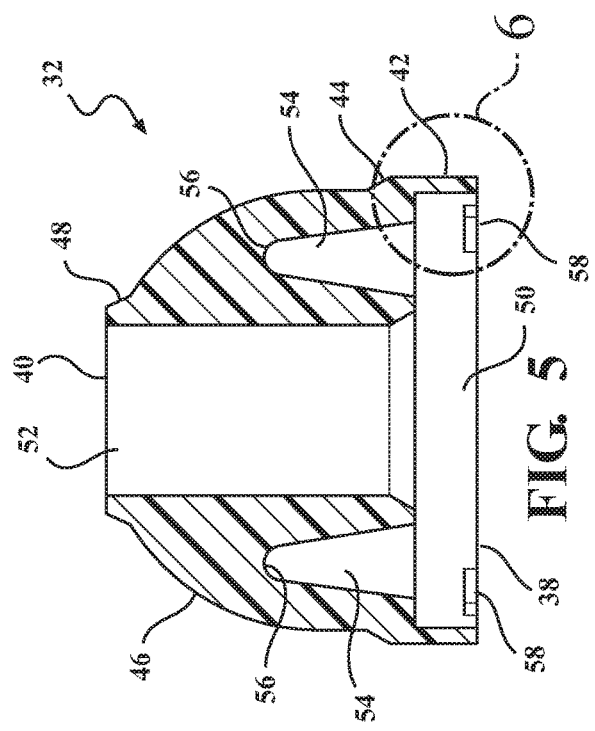
FIG. 4 is a front elevation view of a bushing in the sway bar linkage kit shown in FIG. 3.
Figure 5:
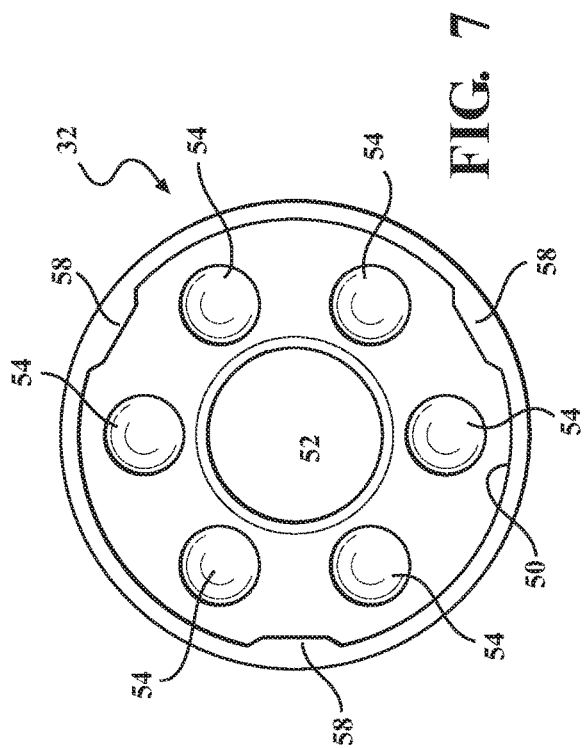
FIG. 5 is a cross-sectional view of the bushing of FIG. 3 taken through Line 5-5 of FIG. 4.
Figure 6:
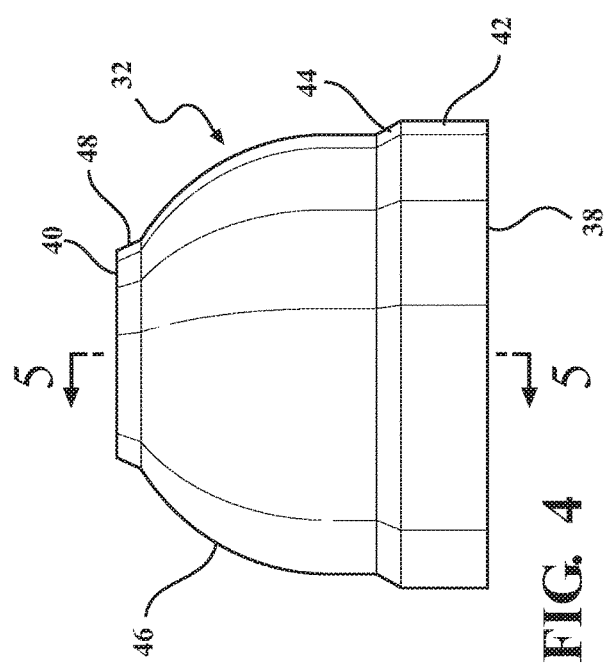
FIG. 6 is an enlarged portion of FIG. 5.
Figure 7:
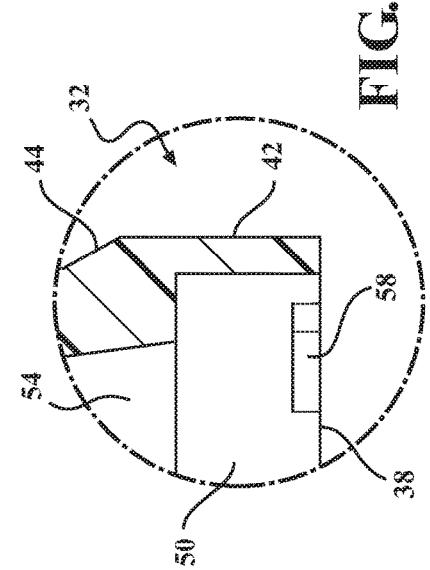
FIG. 7 is a bottom elevation view of the bushing of FIG. 4.

As shown in FIGS. 4 and 6, the bushing 32 further includes a plurality of pockets 54 which open to the counterbore 50 at the first open end of the bushing 32. The pockets 54 extend axially from the counterbore 50 in a direction towards the second end 40 and are generally conically shaped with a rounded bottom 56. In the exemplary embodiment, the bushing 32 includes a total of six pockets 54 which are generally uniformly spaced from one another around the bolt receiving portion 52 of the inner bore and which are generally equally shaped and sized. This arrangement has been found to provide the bushing 32 with a generally uniform deflectability around the axis A. However, it should be appreciated that the bushing 32 could include any suitable number of pockets 54, and those pockets 54 could be equally or differently sized and shaped.

With reference to FIGS. 1 and 4-6, the pockets 54 effectively reduce the thickness of a wall of the bushing 32 between the inner bore and the outer surface, thereby allowing the bushing 32 to more easily deflect and absorb energy while transmitting forces between the sway bar 22 or control arm 24 during operation of the vehicle to protect the bolt 26 from undue stresses in response to sudden shocks. That is, the pockets 54 allow the bushing 32 to elastically deform in response to a lower load when transferring radial forces between the sway bar 22 or the control arm 24 and the bolt 26. The pockets 54 also allow the one-piece bushing 32 to be made of a harder, more durable material (such as, for example, Irogran® 80 P). As such, the sway bar linkage kit 20 has improved durability and an increased operating life because the harder, more durable material of the bushing 32 does not wear or degrade as quickly as relatively softer materials might and also because the deflection allowed by the pockets 54 absorbs energy to reduce stresses imparted by the bushing 32 onto the bolt 26, thereby protecting the bolt 26 from damage.

As shown in FIGS. 3-6, the first end 38 of the bushing 32 also includes a plurality of radially inwardly extending lips 58 which are spaced generally uniformly from one another for retaining the washer 36 within the counterbore 50. In the exemplary embodiment, the bushing 32 has three lips 58 which are spaced from one another by approximately one hundred and twenty degrees (120°). It should be appreciated that the bushing 32 could have any suitable number of lips 58 and the lips 58 could have any suitable spacing. The lips 58 retain the washers 36 within the counterbores 50 of the bushings 32 to prevent dirt or other contaminants from getting into the pockets 54 and compromising the performance of the bushings 32.

Referring back to FIGS. 1-3, the linkage kit 20 is installed in the vehicle by first inserting one of the washers 36 and one of the bushings 32 onto the bolt 26. Next, the bolt 26 is inserted through the opening in the sway bar 22 such that the bushing 32 directly contacts the sway bar 22. Next, in this order, a second bushing 32, a second washer 36, the spacer 34, a third washer 36 and a third bushing 32 are inserted onto the bolt 26. The third bushing 32 is then brought into direct contact with the control arm 24 at the opening in the control arm 24. Finally, the last bushing 32 and another washer 26 are inserted onto the bolt 26, and the barrel nut 30 is threaded onto the threaded end of the bolt 26 to secure the components on the bolt 26.

Figure 8:
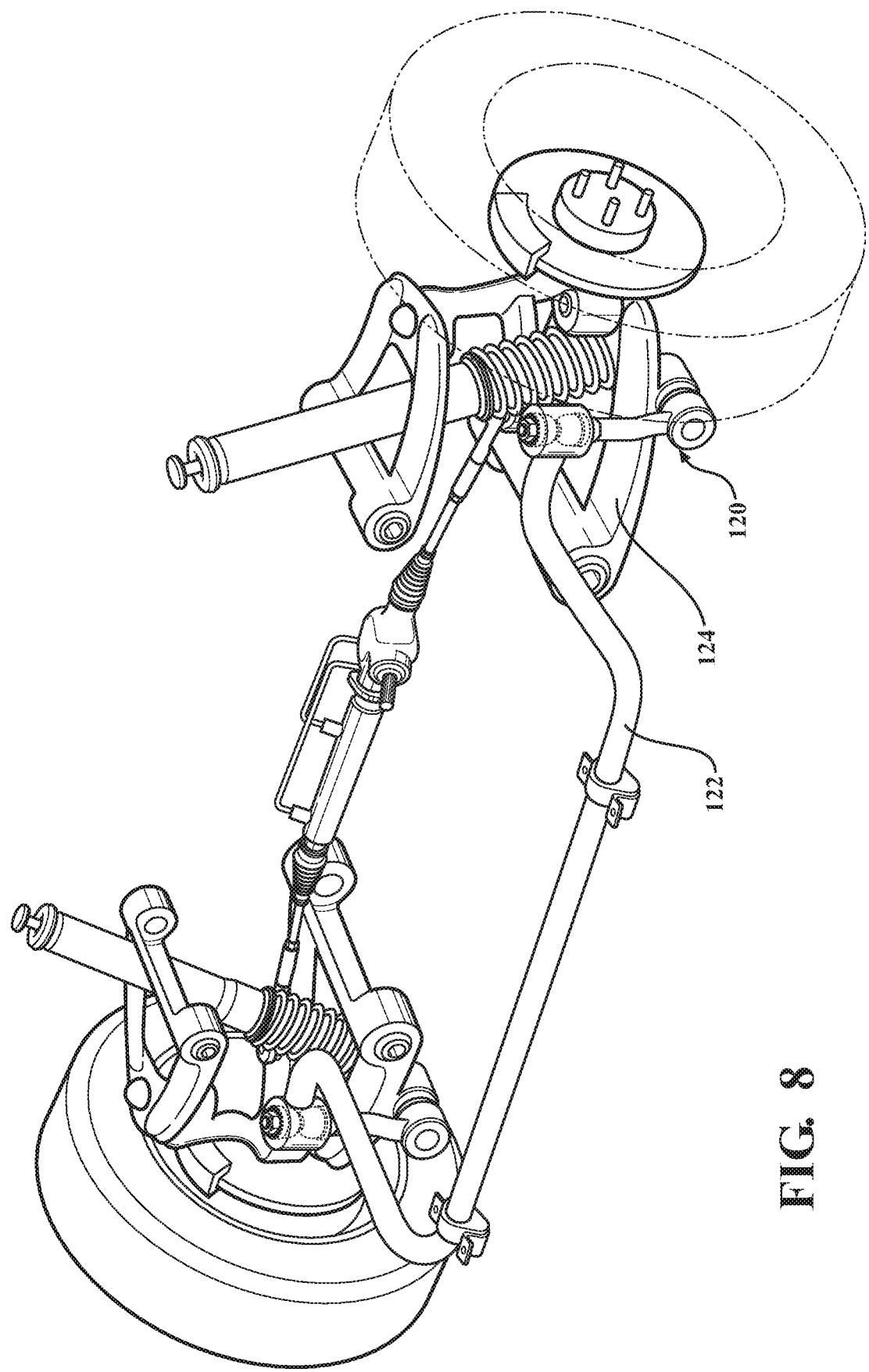
FIG. 8 is a perspective view of a vehicle suspension system with a second embodiment of the linkage extending between and interconnecting a sway bar and a control arm.
Figure 9:
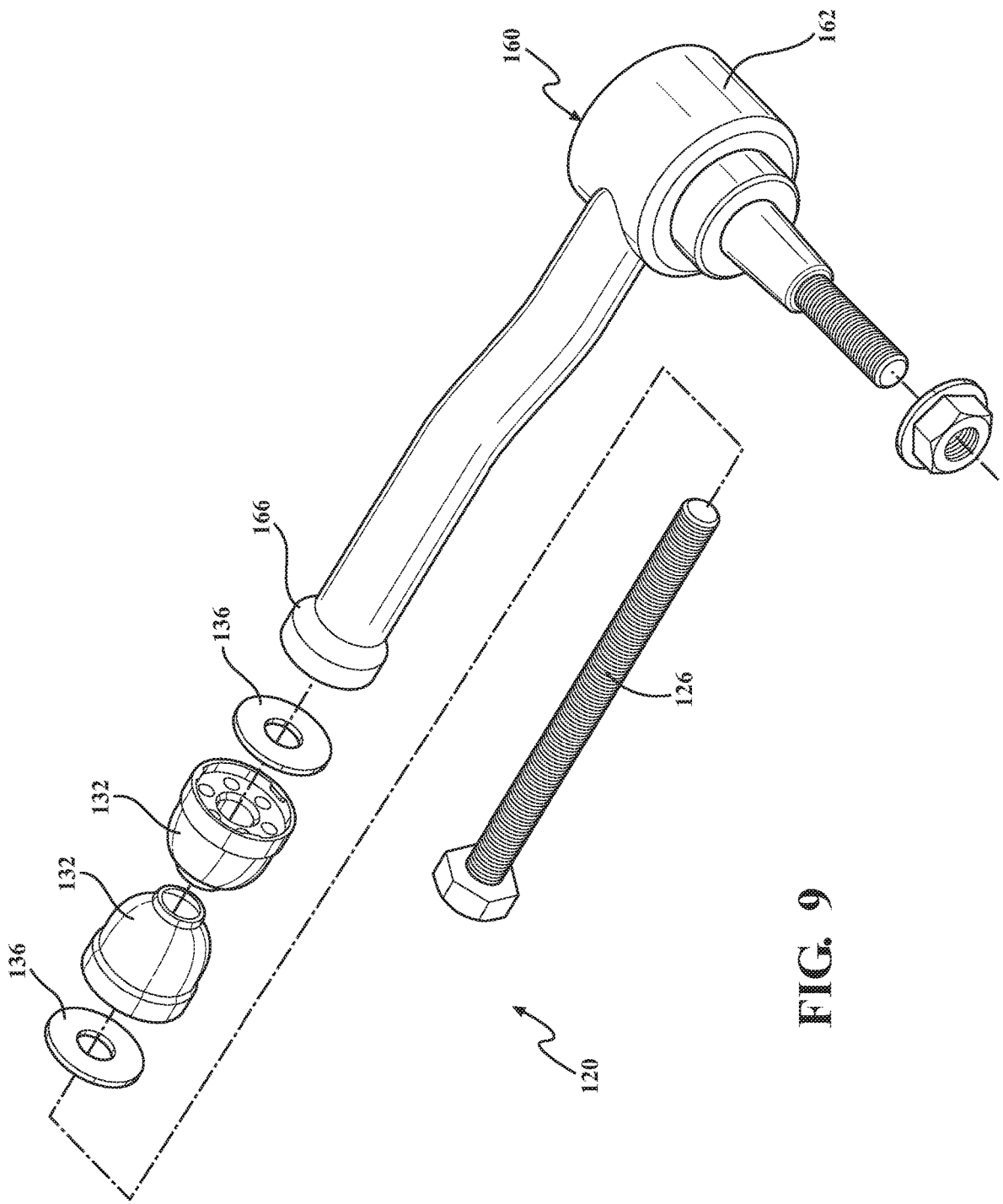
FIG. 9 is a partially exploded view of the second embodiment of the linkage.
Figure 10:
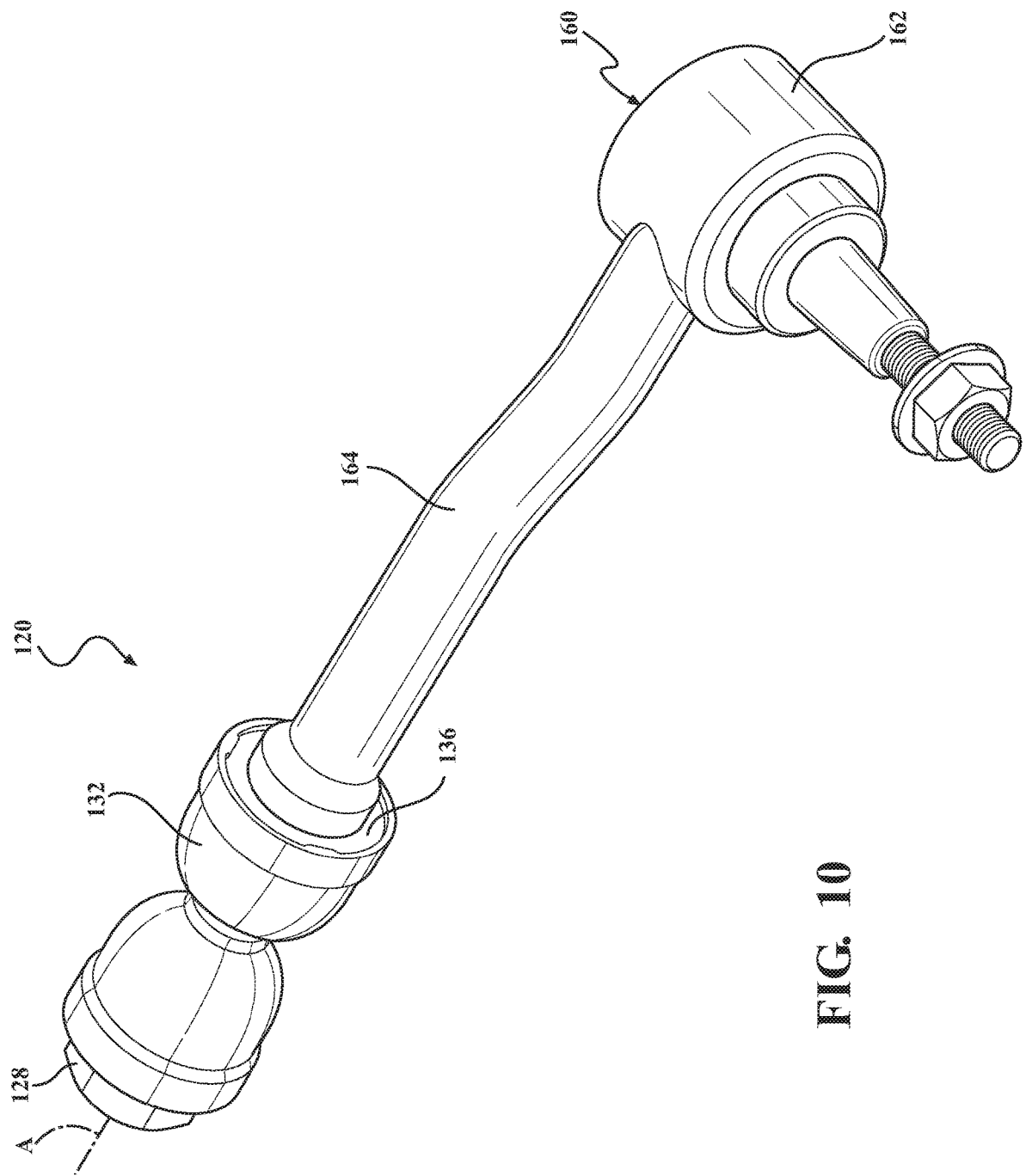
FIG. 10 is a perspective view of the second embodiment of the linkage.

Referring now to FIGS. 8-10, a second exemplary embodiment of the linkage kit 120 is generally shown with like numerals, separated by a prefix of "1" identifying corresponding parts with the first exemplary embodiment described above. The second embodiment is distinguished from the first embodiment in that the bushings 132 are only used to connect the linkage kit 120 with the sway bar 122, and a ball joint 160 is employed to connect the linkage kit 120 with the control arm 124. In this embodiment, a ball stud of the ball joint 160 is oriented generally perpendicularly to the fastener 126. However, it should be appreciated that the ball joint 160 could alternately be oriented in parallel with the fastener 126 or at any suitable angle relative thereto.

The ball joint 160 includes a housing 162 with a post 164 which extends outwardly therefrom. The post 164 extends to a threaded distal end which forms at least a portion of the fastener 126 that extends through the sway bar opening. The post 164 is provided with a radially outwardly extending flange 166 which defines a stopping point for the bushings 132 on the fastener 126. In this embodiment, the post 164 is internally threaded to receive the fastener 126. Alternately, the post and fastener could be made as a single, monolithic piece with the housing 162 of the ball joint 160.

Obviously, many modifications and variations of the present invention are possible in light of the above teachings and may be practiced otherwise than as specifically described while within the scope of the appended claims.

What is claimed is:

1. A sway bar linkage kit for connecting a sway bar with a control arm of a vehicle suspension system, comprising:
   a fastener;
   at least two bushings;
   at least one of said bushings being constructed as a single piece of material, presenting an outer surface which extends from a first end that has a first diameter to a second end that has a second diameter which is less than said first diameter, presenting an inner bore which extends along an axis for receiving said fastener, presenting a counterbore adjacent said first end, presenting a plurality of pockets which are spaced radially between said inner bore and said outer surface for allowing said bushing to more easily deflect and absorb energy while transferring forces, and said pockets only opening into said counterbore adjacent said first end; and
   a washer received in said counterbore and covering said pockets.

2. The sway bar linkage kit as set forth in claim 1 wherein all of said bushings are generally identically constructed and wherein a washer is received in said counterbore of each of said bushings.

3. The sway bar linkage kit as set forth in claim 2 wherein each of said bushings presents a plurality of radially inwardly extending lips adjacent an axial end with said counterbore for trapping one of said washers in said counterbore.

4. The sway bar linkage kit as set forth in claim 1 wherein said fastener is fixedly attached with a ball joint.

5. The sway bar linkage kit as set forth in claim 4 wherein said fastener is formed as a single piece with a housing of said ball joint.

6. The sway bar linkage kit as set forth in claim 5 wherein said fastener is disposed in an end region of a post which extends from said housing of said ball joint.

7. The sway bar linkage kit as set forth in claim 1 wherein said outer surface of each of said bushings has a greater diameter adjacent one axial end than adjacent an opposite axial end.

8. The sway bar linkage kit as set forth in claim 7 wherein said outer surface of each of said bushings includes a spheroidal portion.

9. A vehicle suspension system, comprising:
   a sway bar with a sway bar opening;
   a control arm;
   a linkage interconnecting said sway bar with said control arm;
   said linkage including a ball joint which is operably attached with said control arm and including a fastener which is fixedly attached with said ball joint and which extends through said sway bar opening;
   said linkage further including at least one bushing disposed at least partially in said sway bar opening between said sway bar and said fastener for transferring forces between said sway bar and said fastener;
   said at least one bushing being constructed as a monolithic piece of material, presenting an outer surface which extends from a first end that has a first diameter to a second end that has a second diameter which is less than said first diameter, presenting an inner bore for receiving said fastener, presenting a counterbore adjacent said first end, presenting a plurality of pockets which are spaced radially between said inner bore and said outer surface for allowing said bushing to more easily deflect and absorb energy while transferring forces, and said pockets only opening into said counterbore adjacent said first end; and
   for each of said at least one bushing, a washer received in said counterbore and covering said pockets.

10. The vehicle suspension assembly as set forth in claim 9 wherein said at least one bushing is further defined as two bushings.

11. The vehicle suspension assembly as set forth in claim 10 wherein said bushings are of generally identical construction.

12. The vehicle suspension assembly as set forth in claim 11 wherein said pockets in each of said bushings are generally conical in shape.

13. The vehicle suspension assembly as set forth in claim 9 wherein said ball joint is oriented generally perpendicularly to said fastener.

* * * * *